(12) United States Patent
Bryant

(10) Patent No.: US 6,263,288 B1
(45) Date of Patent: Jul. 17, 2001

(54) METHOD AND APPARATUS FOR INDICATING PROXIMITY OF FILM SCANNER TO CRT DISPLAY MONITOR

(75) Inventor: Steven M. Bryant, Holley, NY (US)

(73) Assignee: Eastman Kodak Company, Rochester, NY (US)

( * ) Notice: Subject to any disclaimer, the term of this patent is extended or adjusted under 35 U.S.C. 154(b) by 0 days.

(21) Appl. No.: 09/120,603

(22) Filed: Jul. 22, 1998

(51) Int. Cl.[7] ............................. G06F 19/00; G01R 29/26
(52) U.S. Cl. .................................... 702/57; 702/69
(58) Field of Search ................... 702/38, 57, 60, 702/65, 66, 69, 108, 111, 127, 183, 182–185, 189–195, 199; 324/95; 340/600; 382/320, 139

(56) References Cited

U.S. PATENT DOCUMENTS

| | | | |
|---|---|---|---|
| 3,582,933 | * | 6/1971 | Place .................................... 340/507 |
| 3,783,448 | * | 1/1974 | Brodwin .............................. 342/351 |
| 3,952,152 | * | 4/1976 | Lill et al. ............................ 348/821 |
| 4,183,459 | | 1/1980 | Donn et al. ............................ 714/49 |
| 4,684,989 | | 8/1987 | Roeder et al. ....................... 348/607 |
| 4,760,456 | * | 7/1988 | Liang ................................... 348/820 |
| 4,839,908 | | 6/1989 | Takayama ............................ 375/351 |
| 5,255,202 | | 10/1993 | Kido et al. ........................... 702/190 |
| 5,265,038 | | 11/1993 | Kwok .................................. 702/190 |
| 5,278,777 | | 1/1994 | Cummins ............................ 702/195 |
| 5,317,522 | | 5/1994 | Bonet et al. ......................... 700/280 |
| 5,319,573 | | 6/1994 | Corleto et al. ....................... 700/280 |
| 5,323,337 | | 6/1994 | Wilson et al. ......................... 702/73 |
| 5,337,261 | | 8/1994 | Rogers ................................. 702/190 |
| 5,339,335 | | 8/1994 | Molnar ................................ 375/350 |
| 5,586,064 | | 12/1996 | Grupp .................................. 702/190 |
| 5,650,935 | | 7/1997 | Nishino et al. ....................... 702/57 |
| 5,887,075 | * | 3/1999 | Kruppa ................................ 382/139 |

* cited by examiner

Primary Examiner—Kamini Shah
Assistant Examiner—Manuel L. Barbee
(74) Attorney, Agent, or Firm—Francis H. Boos, Jr.

(57) ABSTRACT

A photographic film scanner having magnetic data read capability is provided with a function that senses an unacceptably high electromagnetic noise interference in the read head output, such as might be caused by the scanner being too close to a host computer monitor, and that outputs a warning to the user to alert the user to the need to move the scanner farther away from the monitor. The warning can be in the form of a visual display, such as a warning message displayed on the computer monitor or a blinking red light on the scanner. Alternatively, or else in conjunction with the visual warning, it can be an audible warning such as a voice message or a beeping sound.

17 Claims, 3 Drawing Sheets

METHOD AND APPARATUS FOR INDICATING PROXIMITY OF FILM SCANNER TO CRT DISPLAY MONITOR

FIELD OF THE INVENTION

This invention relates generally to the field of photographic film scanners, and in particular to film scanners having magnetic read heads for reading magnetically recorded data from the film in conjunction with film scanning.

BACKGROUND OF THE INVENTION

The recently introduced Advanced Photo System (APS) employs a magnetic coating on photographic film for the purpose of magnetically recording data on the film which data provides information concerning associated images exposed onto the film. Film scanners are known which are used to optically scan the images on the processed film to develop digital image data which can be input to a computer to allow storage and manipulation of the image data and digital printing of hard copy prints of the images. Some scanners employ magnetic read heads to permit reading of the magnetically recorded data from the film magnetic layer, the data being stored in the computer memory along with the digital image data for use therewith.

The magnetic layer on this photographic film is virtually transparent which means that the magnetic oxide content is relatively low as compared to traditional magnetic recording media such as video or audio tapes. As a consequence, the magnetic read head and related magnetic signal processing circuits must be very sensitive to detect the relatively low amplitude data signals and must employ significantly high gain factors to raise the detected signals to suitable levels for signal processing. These factors make magnetic data read apparatus in film scanners highly susceptible to external sources of electromagnetic noise.

By the very nature of film scanners connected to computers, particularly in a consumer's home environment, the film scanner is typically located in somewhat close proximity to the computer monitor which is a relatively strong source of electromagnetic noise. Consumer users of film scanners tend not to be cognizant of this problem. If erroneous data reads occur as a result of this electromagnetic interference, the user is likely to be confused and frustrated by the data errors that occur. A known solution to this problem is to provide special electromagnetic shielding around at least the magnetic read head portion of the scanner to absorb the external magnetic fields that the read heads are susceptible to with consequent added bulk and cost. Moreover, the shielding is not always sufficiently effective to protect the scanner, particularly in the case of a scanner placed in very close proximity to the monitor. One known APS film scanner manufacturer attempts to solve this problem by placing a warning notice in the user's manual advising the user not to place the scanner too close to the computer monitor. This has the problem that users notoriously ignore warning notices in a user's manual and, in many cases do not even read the user's manual. Even if the user heeds the printed warning, it is difficult to effectively specify a proper distance that would be effective in all cases. There is therefore a need for a simple, effective and low cost solution to this interference problem when operating a film scanner with magnetic read capability near a computer monitor.

SUMMARY OF THE INVENTION

In accordance with one aspect of the invention therefore, there is provided a method of determining that a film scanner having a magnetic read head is in detrimentally close proximity to a source of electromagnetic radiation. The method comprises sensing an output of a magnetic read head in the scanner during a predetermined time period during which film magnetic data transitions are not present at the read head. This can be prior to insertion of the film into the scanner film path or with the film held stationary during the sensing period or by momentarily moving the read head away from the film surface during the sensing period. The method next involves determining from the sensed output the presence of an amount of electromagnetically induced noise that will detrimentally affect detectability of data signal transitions sensed by the magnetic read head; and generating an output indication representative of the fact that the film scanner is detrimentally close to said source of electromagnetic radiation.

In accordance with another aspect of the invention apparatus for determining that a film scanner having a magnetic read head is in detrimentally close proximity to a source of electromagnetic radiation, wherein the apparatus comprises a magnetic read head; a magnetic read head circuit; and a circuit that senses an output of a magnetic read head in the scanner during a predetermined time period during which film magnetic data transitions are not present at the read head. The apparatus of the invention also includes a controller that determines from said sensed output the presence of an amount of electromagnetically induced noise that will detrimentally affect detectability of data signal transitions sensed by the magnetic read head, and a controller that generates, in response to said determination, an output indication representative of the fact that the film scanner is detrimentally close to said source of electromagnetic radiation. The controller functions may be contained within a single microprocessor included within the scanner or entirely within a host computer to which the scanner is connected or the controller functions may be distributed between the host computer and scanner microprocessor.

These and other aspects, objects, features and advantages of the present invention will be more clearly understood and appreciated from a review of the following detailed description of the preferred embodiments and appended claims, and by reference to the accompanying drawings.

DETAILED DESCRIPTION OF THE INVENTION

Figure 1:
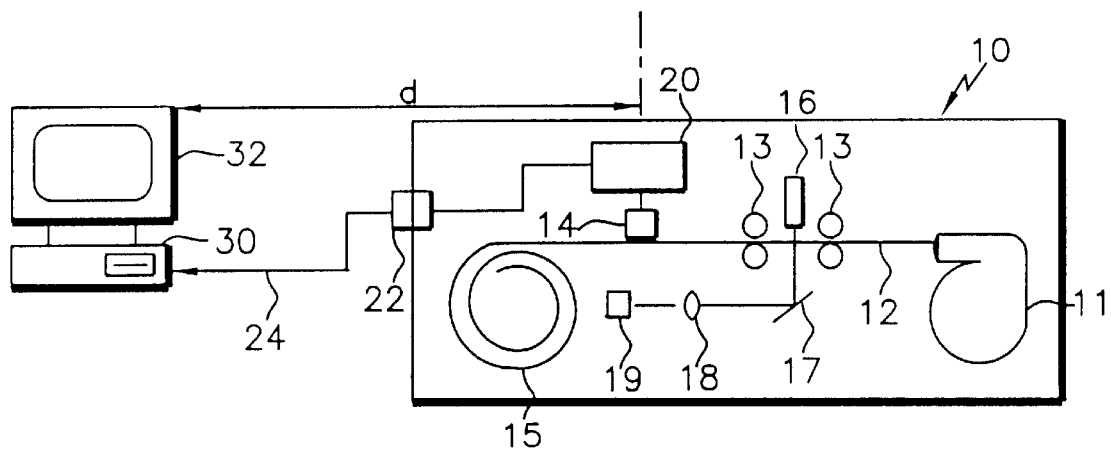
FIG. 1 is a simplified diagram of a film scanner and computer system for which the present invention is well suited.

In FIG. 1 a film scanner 10 includes a film cartridge supply 11 for supplying processed film 12 having a magnetic recording coating on which magnetic data is recorded. Film drive rollers 13 drive the film along a confined film path past a magnetic read head 14 and into a film takeup chamber 15. A light source 16, mirror 17, focussing lens 18 and CCD sensor 19 comprise an optical imaging channel used in generating digital image data from image frame on the film 12. The details of this latter function are well known and are not described further herein since they are not a part of the present invention.

In an actual film scanner, up to four magnetic read heads may be provided, one for each of the data tracks formed on the film magnetic layer in accordance with known principles of the Advanced Photo System. The outputs of the magnetic read heads are fed to read head and signal processing circuits 20 for sensing and processing of the analog data signals on the data tracks into digital data signals. The output of the read head circuits is coupled through a host interface 22 and a cable 24 to a host computer 30 for storage and use in connection with digital image data provided from image scanning elements (not shown) of the scanner 10. The cable 24, typical of cables used for connecting peripheral devices to a computer, is generally in the range of two and one-half to five feet in length. The computer 30 includes a CRT monitor 32. It is well known that the CRT monitor is a source of electromagnetic radiation that typically generates a significant electromagnetic field around the monitor extending from a few inches to as much a 24 inches from the monitor, depending on the particular monitor design. Within this range, the field can be sufficient to cause noise interference with the magnetic data read and signal processing capability of the data read head and circuits in the scanner 10. Accordingly, it is important to ensure that the user of the film scanner positions the scanner at a distance "d" that is far enough away from the computer that the electromagnetic field will not detrimentally affect the performance of the magnetic data read functions of the scanner.

Figure 2:
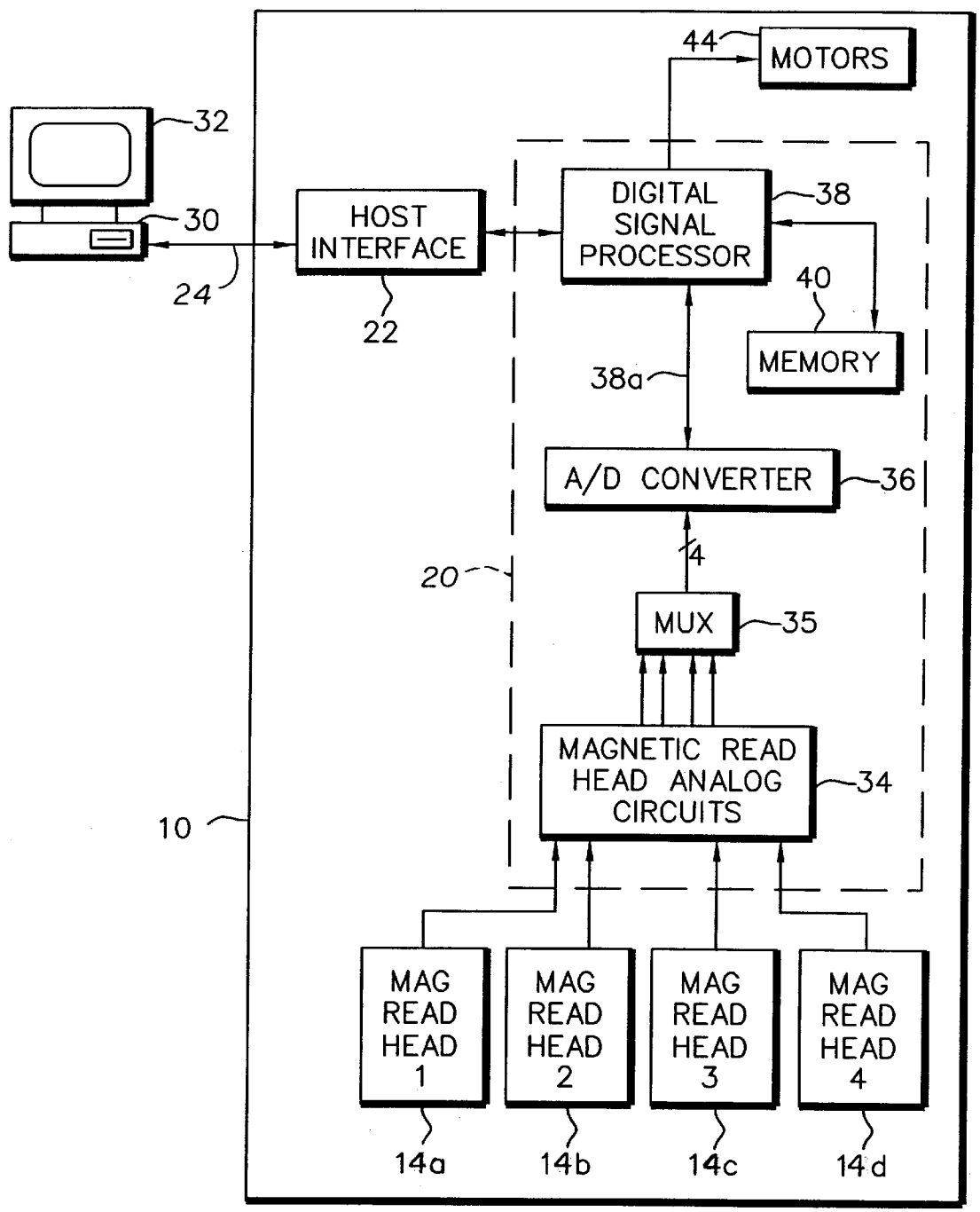
FIG. 2 is a functional block diagram of portions of the film scanner used in the operation of the present invention.

Turning now to FIG. 2, further details of the scanner construction relevant to the present invention are shown in which elements common to FIG. 1 carry the same reference numerals. Thus, the illustrated scanner 10 is shown as including four read heads 14a–14d each connected through separate analog read head circuits 34, the separate read head outputs then being coupled through a multiplexer (MUX) 35 to a common A/D circuit 36 which operates under the control of a digital signal processor 38 to convert the analog data signals into digital data signals that can be temporarily stored in a memory unit 40 prior to being sent to the host computer. The processor 38 serves as a controller providing control of the various functional blocks in the scanner. Bi-directional line 38a represents a forward path for digitized data from the A/D converter 36 to the processor 38 and a separate path for sending control bits from the processor 38 to the A/D converter 36 to control the operation of the A/D converter 36. On command from host computer 30, the data signals are transferred from the processor 38 via host interface 22 and cable 24 to the host computer for processing as appropriate. It will be appreciated that digitized image data signals are also stored and transferred on command to the host computer. Within the scanner 10 there are several motors represented in the drawing by block 44, one of which is used to operate the film drive rollers 13, another to shift a gear mechanism used to set the transport speed of film in the scanner and a third to rotate the spool in the film supply cartridge to thrust film out of the cartridge and rewind film at the conclusion of scanning. These motors are also potential sources of electromagnetic radiation and, as will be seen, the motors are shut off during the electromagnetic noise measurement of the invention.

There will now be described the manner in which the apparatus of FIG. 2 operates in accordance with an embodiment of the invention to determine when the film scanner 10 is in detrimentally close proximity to the monitor 32. Generally, in this embodiment, processor 38 is programmed to sense an output of each of the magnetic heads 14a–14d for a predetermined time period during which film magnetic data transitions on the film magnetic layer are not present at the associated read head. This output sensing, which is done separately for each read head, can be done prior to thrusting film into the scanner film path or, alternatively at a time when the film is held stationary in the film path. A further alternative would be to provide a mechanism which holds the read head out of contact with the film during this sensing phase. Also, during this sensing phase for each read head, the motors 44 are held in the off state to avoid spurious electromagnetic noise interference from the motors. The processor 38 then determines from the sensed read head output whether there is an amount of electromagnetically induced noise that will detrimentally affect detectability of data signal transitions sensed by the magnetic read head and, in response thereto, generates an output indication representative of the fact that the film scanner is detrimentally close to the monitor. In a preferred embodiment of the invention, this output may take the form of a failure indication, e.g. a code value, that generates a visual or audible indication at the scanner itself or that is sent via cable 24 to the host computer 30 to generate a visual display on the computer monitor 32 advising the user of the closeness of the scanner and directing that the scanner be moved away from the monitor by a safe distance. The computer may also respond to the failure indication to generate an audible signal alerting the user to the problem.

Figure 4:
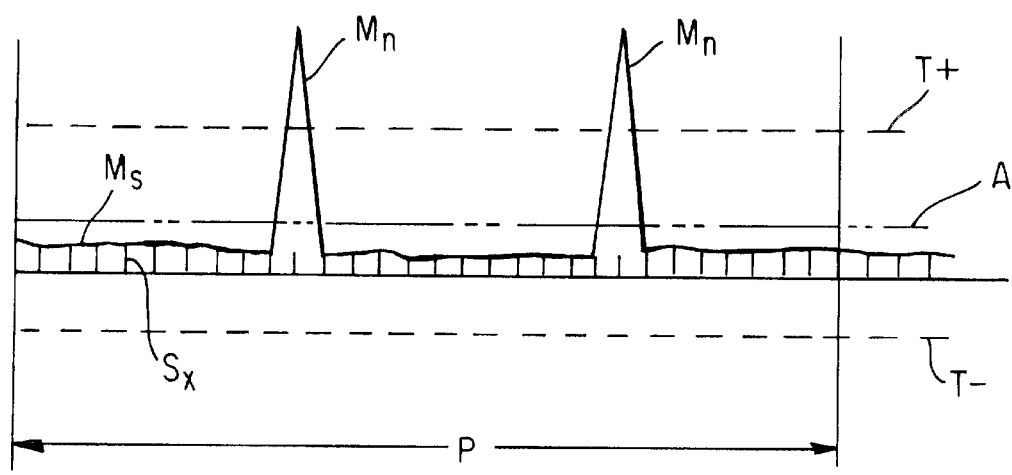
FIG. 4 is a signal waveform at the output of a magnetic read head circuit useful in explaining the operation of the invention.
Figure 3:
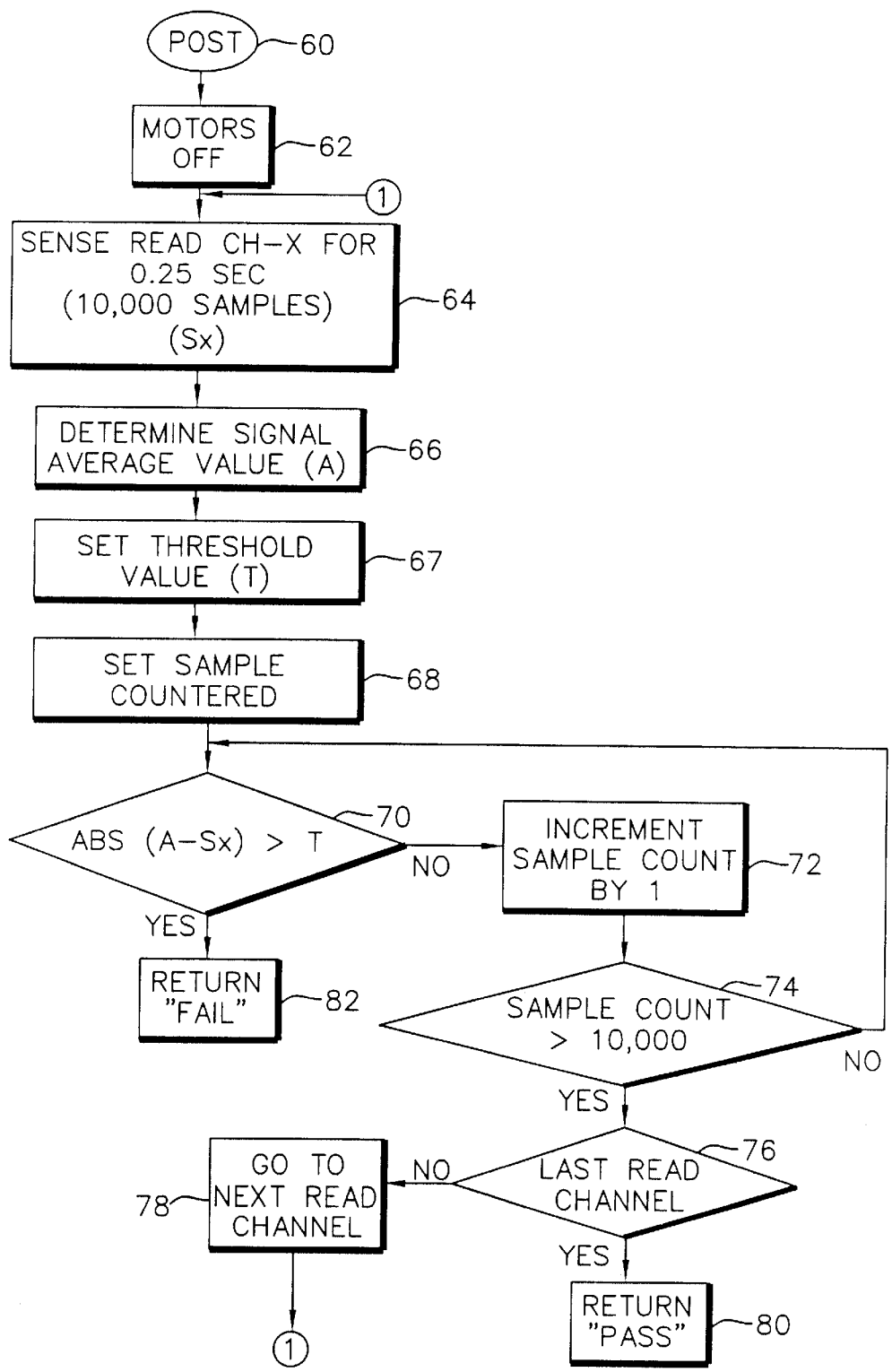
FIG. 3 is a flow diagram illustrating the operation of the controller apparatus of the film scanner system in accordance with an embodiment of the invention.

Referring jointly to FIGS. 3 and 4, the manner in which the processor (controller) 38 may be programmed to carry out this method will be described. When a user applies power to the scanner and starts the scanner program on the host computer, the host computer downloads the scanner program to the scanner 10 and sends a command to enter the POST ("power on self test") program module at 60. This module performs a number of scanner self tests to verify proper operation, one of which is the proximity check of the invention. The program turns off the motors 44 at 62, if they were on, and initiates a read head sensing operation at 64. This sensing operation continues for a fixed predetermined amount of time "P" such as 0.25 second to generate an output "$M_s$" from the read head. The amount of time may be other than 0.25 second but should be sufficiently long to ensure capturing the electromagnetic noise anomaly of interest. In the case of a CRT monitor, the line scan and field scan rate determine the frequency of the electromagnetic spikes of radiated noise and 0.25 second is adequate to ensure that a number of such spikes will be sensed. As part of the sensing operation, the output, $M_S$, is sampled in the A/D converter a number of times, e.g. 10,000 samples, to convert of the analog output $M_s$ into digitized output values "$S_x$". The sampling rate for this conversion should be sufficiently high to ensure proper sensing at the frequency of expected anomalies being checked for. At 66, an average value "A" of the sensed, sampled values is generated over the sensed interval (0.25 second). At 67, a threshold value "T" is set to correspond to a predetermined allowable read head output value of electromagnetically induced noise that will not detrimentally degrade magnetic data read capability of the magnetic read head. This is empirically determined in relation to a minimum level peak data signal output from the read head. For example, in an actual embodiment in which the minimum peak data signal output of 1.0 volts is desired for reliable reading, a threshold of allowable electromagnetically induced noise was considered to be 0.25 volt and a threshold value was set at block 67 which corresponded to this amplitude. At 68, a sample counter is initialized to "0".

This counter is used to step through the captured array of samples. Query 70 tests the absolute value difference between the average value, A, from 66 with the value, $S_x$, each sample taken during the sensed output period. If the magnitude of the difference is less than the threshold value, either positive, T+, or negative, T−, the counter is incremented at 72 and the test is repeated until query 74 determines that all samples (10,000 in the actual embodiment) have been tested. If at any point in the testing of the samples in query 70, the absolute magnitude of the difference between the sample value and the average value is determined to be greater than the threshold value, as would be the case for noise spikes "$M_n$", a failure indication is returned at 82. As previously described, this failure indication may be used by appropriate devices in the scanner to indicate to the user that the scanner is too close to the monitor or, more preferably, the indication may be communicated back to the host computer which then displays a visual message to the user indicating the problem and advising the user to move the scanner further away from the monitor. An audible warning may also be issued.

If the sample testing proceeds through all the samples in the sensed period without a failure indication, query 76 determines if all magnetic read heads have been tested and, if not, the program, at 78, returns to block 64 to repeat the test for the next read head in the sequence. This is accomplished by setting the A/D multiplexer (MUX) 36 to look at the next read head channel. Once query 76 determines that all read head channels have been successfully tested, the program returns a "pass" indication at 80.

In a preferred form of the invention, the "pass" or "fail" indications are sent to the host computer to generate within the host computer program a display command the visually alerts the scanner user to the fact that the scanner is too close to the computer monitor and should be moved further away from the monitor. As previously mentioned, audible warnings might also be generated to indicate the existence of the problem as well as a visible warning at the scanner itself, such as by a blinking red light, that alerts the user to the need to move the scanner away from the monitor.

The invention has been described in detail with particular reference to certain preferred embodiments thereof, but it will be understood that variations and modifications can be effected within the spirit and scope of the invention.

What is claimed is:

1. A method of determining that a film scanner having a magnetic read head is in detrimentally close proximity to a source of electromagnetic radiation, the method comprising:

sensing an output of a magnetic read head adapted to sense film magnetic data transitions during a predetermined time period during which film magnetic data transitions are not present at the read head;

determining from said sensed output the presence of an amount of electromagnetically induced noise that will detrimentally affect detectability of data signal transitions sensed by the magnetic read head; and generating an output indication representative of the fact that the film scanner is detrimentally close to said source of electromagnetic radiation.

2. The method of claim 1 further providing, in response to said output indication, a warning sensible to the user that alerts the user to the fact that said scanner is in detrimentally close proximity to said source of electromagnetic radiation.

3. The method of claim 2 wherein said source of electromagnetic radiation is a computer CRT monitor.

4. The method of claim 3 wherein said warning is provided in the form of a warning display on said CRT monitor.

5. The method of claim 4 wherein said warning includes an instruction to move the scanner further away from the CRT monitor.

6. The method of claim 3 wherein said warning is provided in the form of an audible warning.

7. The method of claim 6 wherein said warning includes an instruction to move the scanner further away from the CRT monitor.

8. The method of claim 1 wherein said determining of sensed output and generating of an output indication are performed during an initial power up phase prior to performing scanning and reading of magnetic data from said film.

9. A method of determining that a film scanner having a magnetic read head is in detrimentally close proximity to a source of electromagnetic radiation, the method comprising:

sensing an output of said magnetic read head adapted to sense film magnetic data transitions during a predetermined time period during which film magnetic data transitions are not present at the read head;

providing a threshold value of said output corresponding to a predetermined allowable level of electromagnetically induced noise that will not detrimentally degrade magnetic data read capability of said magnetic read head;

comparing an amplitude characteristic of the magnetic read head output sensed during said predetermined time period with said threshold value; and outputting a failure indication if said amplitude characteristic exceeds said predetermined allowable output noise level.

10. The method of claim 9 further including generating, in response to said failure indication, a warning sensible to the user that alerts the user to the fact that said scanner is in detrimentally close proximity to said source of electromagnetic radiation.

11. The method of claim 9 wherein said source of electromagnetic radiation is a computer CRT monitor.

12. The method of claim 9 wherein said sensing of an output of said magnetic read head and outputting of a failure indication are performed during an initial power up phase prior to performing scanning and reading of magnetic data from said film.

13. Apparatus for determining that a film scanner having a magnetic read head is in detrimentally close proximity to a source of electromagnetic radiation, the apparatus comprising:

a magnetic read head adapted to sense film magnetic data transitions;

magnetic read head circuit;

a circuit that senses an output of a magnetic read head in the scanner during a predetermined time period during which film magnetic data transitions are not present at the read head, and a controller that determines from said sensed output the presence of an amount of electromagnetically induced noise that will detrimentally affect detectability of data signal transitions sensed by the magnetic read head, and controller that generates, in response to said determination, an output indication representative of the fact that the film scanner is detrimentally close to said source of electromagnetic radiation.

14. The apparatus of claim 13 wherein said sensing of the output of the magnetic read head and each of the controller functions are performed during an initialization phase prior to commencing scanning of said film and reading of magnetic data from said film.

15. A system for determining that a film scanner having a magnetic read head is in detrimentally close proximity to a source of electromagnetic radiation, the system comprising:

a magnetic read head adapted to sense film magnetic data transitions;

a magnetic read head circuit;

a circuit that senses an output of a magnetic read head in the scanner during a predetermined time period during which film magnetic data transitions are not present at the read head; and controller apparatus that determines from said sensed output the presence of an amount of electromagnetically induced noise that will detrimentally affect detectability of data signal transitions sensed by the magnetic read head; that generates, in response to said determination, an output indication representative of the fact that the film scanner is detrimentally close to said source of electromagnetic radiation; and that provides, in response to said output indication a sensible warning to a user of the film scanner indicative of the film scanner being in detrimentally close proximity to said source of electromagnetic radiation.

16. The system of claim 15 wherein said controller apparatus includes a programmable computer and a computer CRT monitor comprising the source of electromagnetic radiation and said computer is programmed to provide said warning in the format of a visible display on the CRT monitor.

17. The system of claim 15 wherein said sensing of the output of the magnetic read head and the controller apparatus functions, including provision of a sensible warning to the user, are performed during an initialization phase prior to commencing scanning of said film and reading of magnetic data from said film.

* * * * *